(12) United States Patent
Liu et al.

(10) Patent No.: US 10,440,532 B2
(45) Date of Patent: Oct. 8, 2019

(54) METHOD, MOBILE TERMINAL, AND SERVER FOR DISPLAYING DATA ANALYSIS RESULT

(71) Applicant: Tencent Technology (Shenzhen) Company Limited, Shenzhen (CN)

(72) Inventors: Jing Liu, Shenzhen (CN); Long Chen, Shenzhen (CN); Longjun Sun, Shenzhen (CN); Yihui Nong, Shenzhen (CN); Yongsheng Lin, Shenzhen (CN); Feihong Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/678,522

(22) Filed: Aug. 16, 2017

(65) Prior Publication Data

US 2017/0347250 A1 Nov. 30, 2017

Related U.S. Application Data

(63) Continuation of application No. 14/458,137, filed on Aug. 12, 2014, now Pat. No. 9,775,013, which is a
(Continued)

(30) Foreign Application Priority Data

Sep. 27, 2013 (CN) .......................... 2013 1 0451380

(51) Int. Cl.
*G06F 3/048* (2013.01)
*H04W 4/18* (2009.01)

(52) U.S. Cl.
CPC ................................... *H04W 4/18* (2013.01)

(58) Field of Classification Search
CPC ...... G06F 17/246; G06F 17/211; G06F 17/24; G06F 17/30554; G06F 17/30572; G06F 19/00; G06F 19/26
See application file for complete search history.

(56) References Cited

U.S. PATENT DOCUMENTS 6,614,433 B1 * 9/2003 Watts .................... G06F 16/951
345/440
2005/0283754 A1 * 12/2005 Vignet .................. G06Q 10/10
717/104
(Continued)

FOREIGN PATENT DOCUMENTS

CN 101303752 A 11/2008
CN 103034640 A 4/2013
(Continued)

OTHER PUBLICATIONS

Tencent Technology, ISRWO, PCT/CN2014/079345, dated Aug. 24, 2014, 8 pgs.
(Continued)

*Primary Examiner* — Justin S Lee
(74) *Attorney, Agent, or Firm* — Morgan, Lewis & Bockius LLP

(57) ABSTRACT

A method includes: sending a data analysis request to a remotely located server, including sending raw data to the remotely located server; receiving from the remotely located server a first reply including one or more static graphical representations of the raw data; sending a user selection of at least one of the one or more of the static graphical representations of the raw data; and in response to sending the user selection of the at least one of the one or more of the static graphical representations of the raw data, receiving a second reply from the remotely located server, including receiving information configurable to create one or more
(Continued)

editable graphical representations of the raw data in accordance with one or more predefined graphical display templates.

20 Claims, 11 Drawing Sheets

Related U.S. Application Data continuation of application No. PCT/CN2014/079345, filed on Jun. 6, 2014.

(56) References Cited

U.S. PATENT DOCUMENTS

| | | | |
|---|---|---|---|
| 2006/0059414 A1* | 3/2006 | Cory | G06T 11/206 |
| | | | 715/215 |
| 2008/0103862 A1 | 5/2008 | Moss et al. | |
| 2008/0134059 A1* | 6/2008 | Kumar | G06T 11/206 |
| | | | 715/760 |
| 2012/0089610 A1* | 4/2012 | Agrawal | G06Q 10/00 |
| | | | 707/741 |
| 2012/0102024 A1* | 4/2012 | Campbell | G06F 17/3089 |
| | | | 707/722 |
| 2012/0330995 A1* | 12/2012 | Muenkel | G06F 17/30424 |
| | | | 707/769 |
| 2013/0097177 A1* | 4/2013 | Fan | G06F 17/30554 |
| | | | 707/748 |
| 2013/0103677 A1* | 4/2013 | Chakra | G06F 17/30994 |
| | | | 707/723 |
| 2013/0124478 A1* | 5/2013 | Ginzburg | G06F 17/246 |
| | | | 707/639 |
| 2013/0198038 A1 | 8/2013 | Mowatt et al. | |

FOREIGN PATENT DOCUMENTS

| | | |
|---|---|---|
| WO | WO 2010054284 A1 | 5/2010 |
| WO | WO 2012154286 A1 | 11/2012 |

OTHER PUBLICATIONS

Tencent Technology, IPRP, PCT/CN2014/079345, dated Mar. 29, 2016, 6 pgs.

* cited by examiner

1300

METHOD, MOBILE TERMINAL, AND SERVER FOR DISPLAYING DATA ANALYSIS RESULT

PRIORITY CLAIMS AND RELATED APPLICATION

This application is a continuation application of U.S. patent application Ser. No. 14/458,137, filed Aug. 12, 2014, entitled "METHOD, MOBILE TERMINAL, AND SERVER FOR DISPLAYING DATA ANALYSIS RESULT", which is a continuation application of PCT Patent Application No. PCT/CN2014/079345, entitled "METHOD, MOBILE TERMINAL, AND SERVER FOR DISPLAYING DATA ANALYSIS RESULT" filed on Jun. 6, 2014, which claims priority to Chinese Patent Application No. 201310451380.6, "METHOD, MOBILE TERMINAL, AND SERVER FOR DISPLAYING DATA ANALYSIS RESULT," filed on Sep. 27, 2013, all of which are hereby incorporated by reference in their entirety.

TECHNICAL FIELD

The present application relates the field of communications technologies, and in particular, to a method, mobile terminal, and server for displaying a data analysis result.

BACKGROUND

A current display solution for a data analysis result is generally implemented as follows:

A server analyzes data to obtain a data chart, then takes a screenshot of the data chart, and inserts the screenshot result to a Web page; a mobile terminal browses the Web page by using a browser, and thus, the data analysis result is displayed on the mobile terminal.

The data chart is a form for expressing a data analysis structure, in which the result is shown in the form of a graph, such as a bar graph or a pie graph, or the result is shown in the form of a table.

The foregoing solution is implemented as follows: a server takes a screenshot of a data analysis result and stores the screenshot in a Web page, and a mobile terminal browses the Web page by using a browser. This solution is implemented by means of screenshot, which limits the timeliness for displaying the result data on the mobile terminal, and moreover, it is difficult for the mobile terminal to edit the data content.

SUMMARY

The above deficiencies and other problems associated with the ability to display a data analysis result are reduced or eliminated by the present application disclosed below. In some embodiments, the present application is implemented in a computer system that has one or more processors, memory and one or more modules, programs or sets of instructions stored in the memory for performing multiple functions. Instructions for performing these functions may be included in a computer program product configured for execution by one or more processors.

One aspect of the present application involves a computer-implemented method performed by a computer having one or more processors and memory. The computer-implemented method includes: sending a data analysis request to a remotely located server, wherein the data request comprises raw data. The method includes, in response to sending the data analysis request, receiving from the server a reply comprising information to create an editable, graphical representation of the raw data. In response to receiving the reply, determining whether the device has one or more valid graphical display templates corresponding to the information to create the editable, graphical representation, stored in memory. In accordance with a determination that the device has one or more valid graphical display templates corresponding to the information to create the editable, graphical representation, stored in memory, displaying the graphical representation of the raw data on the display using the one or more graphical display templates.

Another aspect of the present application involves a computer system. The computer system includes memory, one or more processors, and one or more programs stored in the memory and configured for execution by the one or more processors. The one or more programs include: sending a data analysis request to a remotely located server, wherein the data request comprises raw data. In response to sending the data analysis request, receiving from the server a reply comprising information to create an editable, graphical representation of the raw data. In response to receiving the reply, determining whether the device has one or more valid graphical display templates corresponding to the information to create the editable, graphical representation, stored in memory. In accordance with a determination that the device has one or more valid graphical display templates corresponding to the information to create the editable, graphical representation, stored in memory, displaying the graphical representation of the raw data on the display using the one or more graphical di splay templates.

Another aspect of the present application involves a non-transitory computer readable storage medium storing one or more programs, the one or more programs comprising instructions, which when executed by an electronic device with a display and a camera, cause the device to: send a data analysis request to a remotely located server, wherein the data request comprises raw data. In response to sending the data analysis request, receive from the server a reply comprising information to create an editable, graphical representation of the raw data. In response to receiving the reply, determine whether the device has one or more valid graphical display templates corresponding to the information to create the editable, graphical representation, stored in memory. In accordance with a determination that the device has one or more valid graphical display templates corresponding to the information to create the editable, graphical representation, stored in memory, display the graphical representation of the raw data on the display using the one or more graphical display templates.

Another aspect of the present application involves an electronic device, comprising: a display unit configured to display a data analysis result, and a processing unit coupled to the display unit. The processing unit is configured to: send a data analysis request to a remotely located server, wherein the data request comprises raw data. In response to sending the data analysis request, receive from the server a reply comprising information to create an editable, graphical representation of the raw data. In response to receiving the reply, determine whether the device has one or more valid graphical display templates corresponding to the information to create the editable, graphical representation, stored in memory. In accordance with a determination that the device has one or more valid graphical display templates corresponding to the information to create the editable, graphical representation, stored in memory, display the graphical representation of the raw data on the display using the one or more graphical display templates.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings required for describing the embodiments are introduced below briefly. Apparently, the accompanying drawings in the following description merely show some of the embodiments of the present application, and persons of ordinary skill in the art can obtain other drawings according to the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present application more comprehensible, the following further describes the present application in detail with reference to the accompanying drawings. The described embodiments are merely a part rather than all of the embodiments of the present application. All other embodiments obtained by persons of ordinary skill in the art based on the embodiments of the present application without creative efforts shall fall within the protection scope of the present application.

Figure 1:
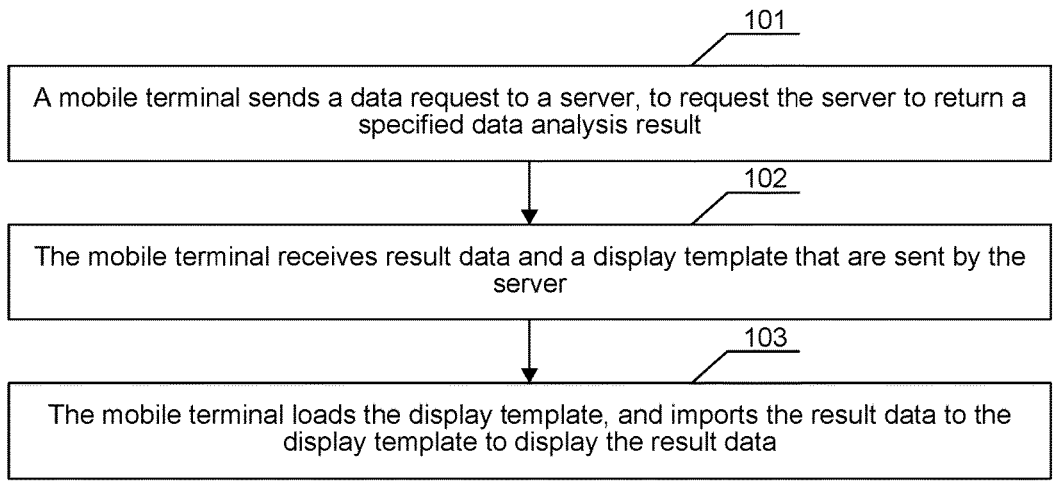
FIG. 1 is a schematic flowchart of a method according to an embodiment of the present application.

An embodiment of the present application provides a method for displaying a data analysis result. As shown in FIG. 1, the method includes the following steps.

101: A mobile terminal sends a data request to a server, to request the server to return a specified data analysis result.

The data request is sent by the mobile terminal, and is used for requesting a message of the specified analysis result. A format and sending manner of the message are not limited in the embodiment of the present application. The following provides an optional solution of the sending manner:

Optionally, the step of a mobile terminal sending a data request to a server includes: the mobile terminal receives a user instruction and starts a browser, and sends the data request to the server through the browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

102: The mobile terminal receives result data and a display template that are sent by the server.

Optionally, the data result is obtained by the side of server through analysis, and in this way, the data analysis result can be obtained on the server in a collective manner, thereby significantly reducing the data processing pressure for devices, such as the mobile terminal, with a low data processing capacity. Types of display templates received by the mobile terminal may not be many, and therefore, the display template can be stored on the side of the mobile terminal, so as to reduce the data traffic of the mobile terminal. It should be noted that, the display template may also be stored on the side of the server and sent by the server to the mobile terminal directly, which does not affect the implementation of the embodiment of the present application. Therefore, this embodiment should not be construed as a limitation to the embodiment of the present application. A specific solution for the mobile terminal to store the display template may be as follows: the step of the mobile terminal receiving result data and a display template that are sent by the server includes:

the mobile terminal receiving result data and a specified display template that are sent by the server.

In this case, the process in which the mobile terminal loads the display template by using the browser includes:

the mobile terminal loading, by using the browser, a locally stored display template corresponding to the specified display template.

Optionally, there are a lot of types of mobile terminals, and the mobile terminals may have different interfaces; therefore, the side of the server may require interface adaptation, so as to be adapted to requirements of different mobile terminals. This embodiment provides a solution that uses interface adaptation, so as to improve the adaptability of the solution in the embodiment of the present application.

Specifically: the step of the mobile terminal receiving result data and a display template that are sent by the server includes:

the mobile terminal receiving result data and a display template that are sent by the server through an interface corresponding to the mobile terminal.

Optionally, the display template is used for importing and displaying data, and according to different functions and different result data, for example, the data volume and data type of the result data, there may be many types of display templates. The embodiment of the present application can be used for displaying chart-type data results, and therefore, specifically, the display template is a chart display template.

103: The mobile terminal loads the display template, and imports the result data to the display template to display the result data.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

Optionally, if the data request is sent by using a browser in the foregoing embodiment, data can be displayed also by using the browser subsequently. This can be combined with functions of the browser, thereby reducing the difficulty in promoting the solution according to the embodiment of the present application. Specifically, the step of the mobile terminal loading the display template includes: the mobile terminal loading the display template by using the browser.

Figure 2:
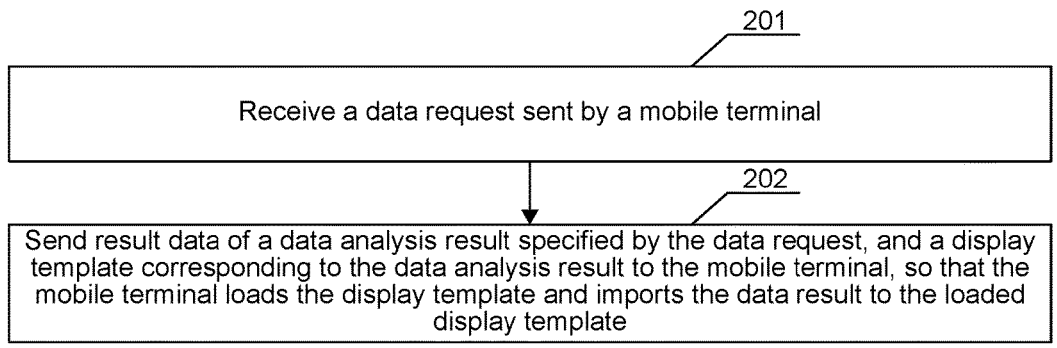
FIG. 2 is a schematic flowchart of a method according to an embodiment of the present application.

An embodiment of the present application provides another method for displaying a data analysis result. The method of this embodiment is implemented on the side of a server, and as shown in FIG. 2, includes the following steps:

201: Receive a data request sent by a mobile terminal.

The data request is sent by the mobile terminal, and is used for requesting a message of a specified analysis result. A format and sending manner of the message are not limited in the embodiment of the present application. The following provides an optional solution of the sending manner:

Optionally, the foregoing step of receiving a data request sent by a mobile terminal includes: receiving a data request sent by a mobile terminal by using a browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

202: Send result data of a data analysis result specified by the data request, and a display template corresponding to the data analysis result to the mobile terminal, so that the mobile terminal loads the display template and imports the data result to the loaded display template.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

The following embodiment is described by using display of chart data as an example, and the embodiment may be specifically as follows:

A chart generally refers to a graphical structure that is displayed on a screen and capable of directly displaying statistical information properties (timeliness, number, and so on), plays a key role in knowledge exploration and expressing information in an intuitive and vivid manner, and is a direct means for visualizing object property data. Chart design belongs to the category of visual communication design. The chart design expresses a phenomenon of an object or an abstract concept of thinking.

Visualized and graphical display of data is an indispensable element in the current industry field, business field, financial field, and so on; visualized display of data is usually implemented by using a chart, so that data is displayed, compared, and analyzed directly. Therefore, charts are widely applied.

A chart has the following features:

Internal and external statistical information of an enterprise is complex and ever-changing, and to better display the information and internal relationships thereof, we need to carry out abstract analysis and study on properties of the information. When we need to display statistical information to users in a visualized form, the display generally includes: what to display—theme feature, where—spatial property, when/how long—time property, degree—number feature, and how—variation feature, and so on. A "V-Pattern" can be introduced to describe eight basic properties during visualization of the statistical information.

1) V (Variety): most statistical information has multiple properties, and different properties should be expressed by using corresponding advantageous media or a comprehensive visualization means;

2) P (Priority): the same piece of statistical information has different importance in different themes or purposes, and an internal structural hierarchical relation should be determined;

3) A (Attachment): statistical information may be classified according to a specific index;

4) T (Timeliness): changes in content, number, and components of statistical information along with time when the statistical information is visualized;

5) T (Theme): in different visualization application targets, different statistical information targets reflect different information themes;

6) E (Extensity): the expression of the statistical information has relative spatial geometric features (point, line, plane, and volume);

7) R (Relativity): the relativity reflects the correlativity (comparison and composition of hierarchical structures) among statistical information;

8) N (Number): the number reflects the absolute or relative quantity feature of the statistical information, and is specific content to be expressed in statistical information visualization.

Classification of charts: bar chart, histogram, line chart, and pie chart are the four most common basic chart types. According to the classification of chart types in Microsoft Excel, chart types further include: scatter diagram, area graph, doughnut, radar chart, bubble chart, stock chart, and so on. In addition, a compound chart type can be formed by combining different charts.

Different types of charts may have different components, for example, a line chart generally requires a coordinate axis while a pie chart does not. To sum up, basic components of a chart include: title, scale, legend, body, and so on.

Histogram:

Data arranged in columns or rows of a worksheet can be drawn in a histogram. The histogram is used for displaying data changes in a period of time or displaying comparison between items.

In the histogram, classes are usually organized along the horizontal axis, while numerical values are organized along the vertical axis.

Line Chart:

Data arranged in columns or rows of a worksheet can be drawn in a line chart. The line chart can display continuous data that changes along with time (which is set according to a regular scale), and therefore is suitable for displaying a data trend at equal time intervals. In the line chart, class data is evenly distributed along the horizontal axis, and all the numerical data is distributed along the vertical axis.

Pie Chart:

Data only arranged in one column or one row of a worksheet can be drawn in a pie chart. The pie chart shows a ratio of the size of each item to the sum of all items in a ratio data series (a data series is related data points drawn in a chart, and the data comes from rows or columns of a data table; each data series in the chart has a unique color or pattern, and is shown in the legend of the chart; one or more data series can be drawn in a chart; a pie chart only has one data series). Data points in the pie chart (data points are individual values drawn in the chart, and these values are expressed by sectors, dots, and other figures referred to as data marks of a bar, column, broken line, pie chart, or doughnut; data marks of the same color form a data series) are shown as the percentage of the whole pie chart.

Bar Chart:

Data arranged in columns or rows of a worksheet can be drawn in a bar chart. The bar chart shows comparison between items.

Area Graph:

Data arranged in columns or rows of a worksheet can be drawn in an area graph. The area graph emphasizes a change degree of the quantity along with time, and can also be used for drawing attention to the trend of the total value. For example, data of profits that change along with time can be drawn in the area graph to emphasize the total profits.

XY Scatter Diagram:

Data arranged in columns or rows of a worksheet can be drawn in an XY scatter diagram. The scatter diagram shows a relation of numerical values in several data series; alternatively, two groups of data are drawn as a series in the xy coordinate.

Stock Chart:

Data arranged in columns or rows of a worksheet in a specific sequence can be drawn in a stock chart. Just as its name implies, the stock chart is usually used to show the fluctuation of share prices. However, this chart can also be used for scientific data. For example, the stock chart can be used to show every-day or annual temperature fluctuation. To create a stock chart, data must be organized according to a correct sequence.

Contour Chart:

Data arranged in columns or rows of a worksheet can be drawn in a contour chart. If you want to find an optimal combination of two groups of data, you can use a contour chart. A color and a pattern represent areas having the same numerical value range, just like in a topographic map.

When the type and data series are both numerical values, a contour chart can be used.

Doughnut:

Data arranged in columns or rows of a worksheet can be drawn in a doughnut. Like a pie chart, the doughnut shows a relation between each part and the whole, but it can include multiple data series (a data series is related data points drawn in a chart, and the data comes from rows or columns of a data table; each data series in the chart has a unique color or pattern, and is shown in the legend of the chart; one or more data series can be drawn in a chart; a pie chart only has one data series.).

Bubble Chart

Data arranged in columns of a worksheet (x values are listed in the first column, and corresponding y values and bubble size values are listed in adjacent columns) can be drawn in a bubble chart.

For example, you can organize data according to the following example.

Radar Chart:

Data arranged in columns or rows of a worksheet can be drawn in a radar chart. The radar chart compares aggregate values of several data series (a data series is related data points drawn in a chart, and the data comes from rows or columns of a data table; each data series in the chart has a unique color or pattern, and is shown in the legend of the chart; one or more data series can be drawn in a chart; a pie chart only has one data series).

Figure 3:
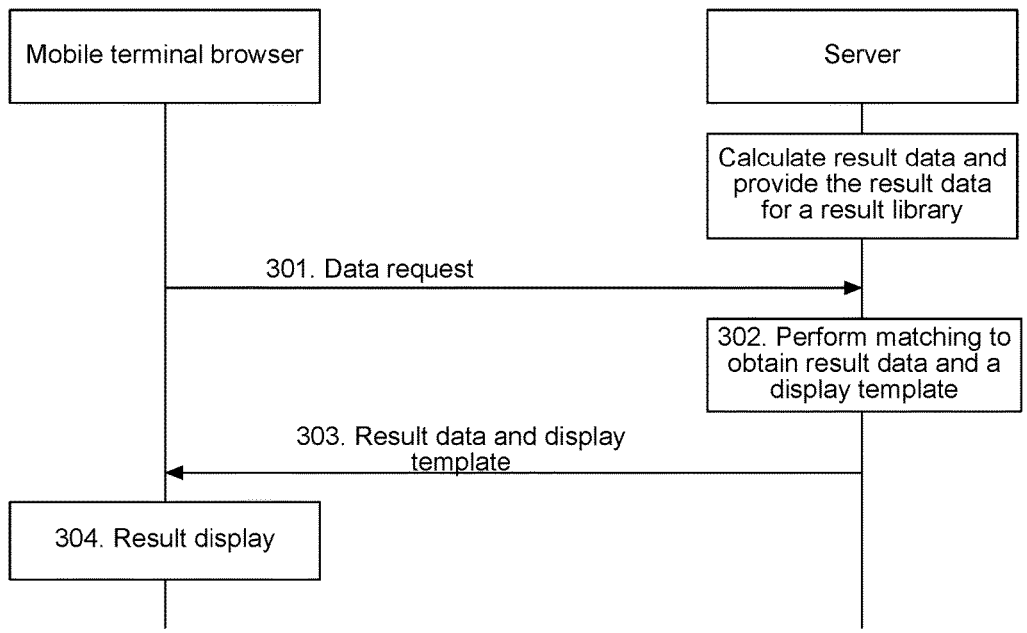
FIG. 3 is a schematic flowchart of a method according to an embodiment of the present application.

In the present application, a data chart display engine is used, and data is automatically adapted to a mobile device screen through a fixed display template, and displayed. The detailed process is shown in FIG. 3 in the following:

301: A browser of a mobile terminal sends a data request to a back-end server, to request the back-end server to return result data of an analysis result.

302: The back-end server performs matching in a result library according to a data analysis result specified by the data request to obtain corresponding result data, and obtains a display template corresponding to the result data.

Before Step 301 or after Step 301 and before Step 302, the back-end server calculates result data, and provides the result data for the result library according to a certain interface. The result library stores various result data for use in query.

The display template may be a fixed chart display template obtained by means of web design. After data is imported to the chart display template, the result data can be displayed.

303: The back-end server sends the result data and the display template to the mobile terminal.

304: The mobile terminal displays a result by using the browser.

In this step, the browser loads the fixed chart display template that is obtained by means of web design, and then imports the result data to the chart display template, so as to display the result.

From the perspective of a user, in the foregoing embodiment, once opening the browser of the mobile terminal to browse a data website, the user can see a corresponding data chart.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

Figure 4:
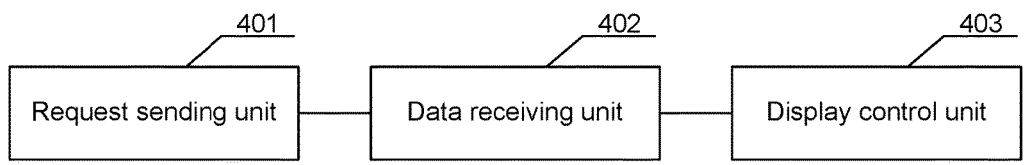
FIG. 4 is a schematic structural diagram of a mobile terminal according to an embodiment of the present application.

An embodiment of the present application further provides a mobile terminal, and as shown in FIG. 4, the mobile terminal includes:

a request sending unit 401, used for sending a data request to a server, to request the server to return a specified data analysis result;

a data receiving unit 402, used for receiving result data and a display template that are sent by the server; and a display control unit 403, used for loading the display template, and importing the result data to the display template to display the result data.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

Optionally, the data request is sent by the mobile terminal, and is used for requesting a message of the specified analysis result. A format and sending manner of the message are not limited in the embodiment of the present application. The following provides an optional solution of the sending manner: the request sending unit 401 is used for: after receiving a user instruction and starting a browser, sending the data request to the server through the browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

Optionally, if the data request is sent by using a browser in the foregoing embodiment, data can be displayed also by using the browser subsequently. This can be combined with functions of the browser, thereby reducing the difficulty in promoting the solution according to the embodiment of the present application. Specifically, the display control unit 403 is used for loading the display template by using the browser.

Optionally, the data result is obtained by the side of server through analysis, and in this way, the data analysis result can be obtained on the server in a collective manner, thereby significantly reducing the data processing pressure for devices, such as the mobile terminal, with a low data processing capacity. Types of display templates received by the mobile terminal may not be many, and therefore, the display template can be stored on the side of the mobile terminal, so as to reduce the data traffic of the mobile terminal. It should be noted that, the display template may also be stored on the side of the server and sent by the server to the mobile terminal directly, which does not affect the implementation of the embodiment of the present application. Therefore, this embodiment should not be construed as a limitation to the embodiment of the present application. A specific solution for the mobile terminal to store the display template may be as follows: the data receiving unit 402 is used for receiving result data and a specified display template that are sent by the server; and the display control unit 403 is used for loading, by using the browser, a locally stored display template corresponding to the specified display template.

Optionally, there are a lot of types of mobile terminals, and the mobile terminals may have different interfaces; therefore, the side of the server may require interface adaptation, so as to be adapted to requirements of different mobile terminals. This embodiment provides a solution that uses interface adaptation, so as to improve the adaptability of the solution in the embodiment of the present application. Specifically: the data receiving unit 402 is used for receiving result data and a display template that are sent by the server through an interface corresponding to the mobile terminal.

Optionally, the display template is used for importing and displaying data, and according to different functions and different result data, for example, the data volume and data type of the result data, there may be many types of display templates. The embodiment of the present application can be used for displaying chart-type data results, and therefore, specifically:

the display template received by the data receiving unit 402 is a chart display template; and the display template loaded by the display control unit 403 is a chart display template.

Figure 5:
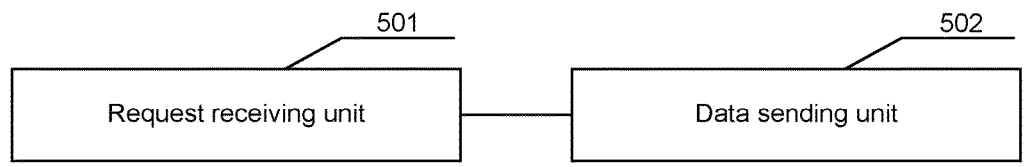
FIG. 5 is a schematic structural diagram of a server according to an embodiment of the present application.

An embodiment of the present application further provides a server, and as shown in FIG. 5, the server includes:

a request receiving unit 501, used for receiving a data request sent by a mobile terminal; and a data sending unit 502, used for sending result data of a data analysis result specified by the data request, and a display template corresponding to the data analysis result to the mobile terminal, so that the mobile terminal loads the display template and imports the data result to the loaded display template.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

The data request is sent by the mobile terminal, and is used for requesting a message of the specified analysis result. A format and sending manner of the message are not limited in the embodiment of the present application. The following provides an optional solution of the sending manner:

Optionally, the foregoing step of receiving a data request sent by a mobile terminal includes: receiving a data request sent by a mobile terminal by using a browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

Figure 6:
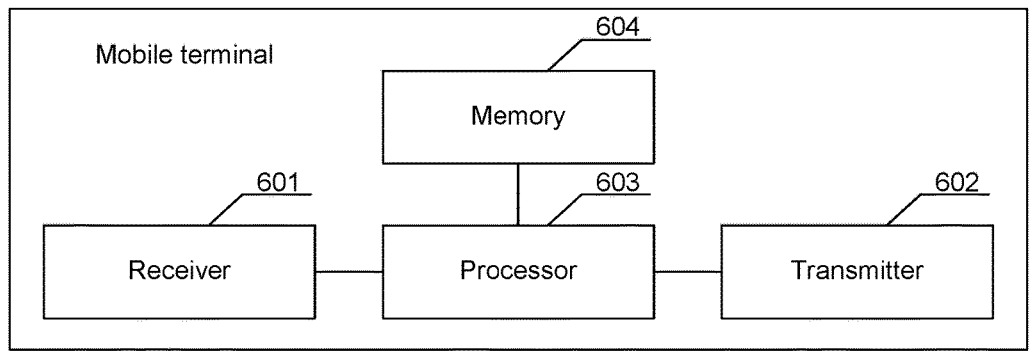
FIG. 6 is a schematic structural diagram of a mobile terminal according to an embodiment of the present application.
Figure 7:
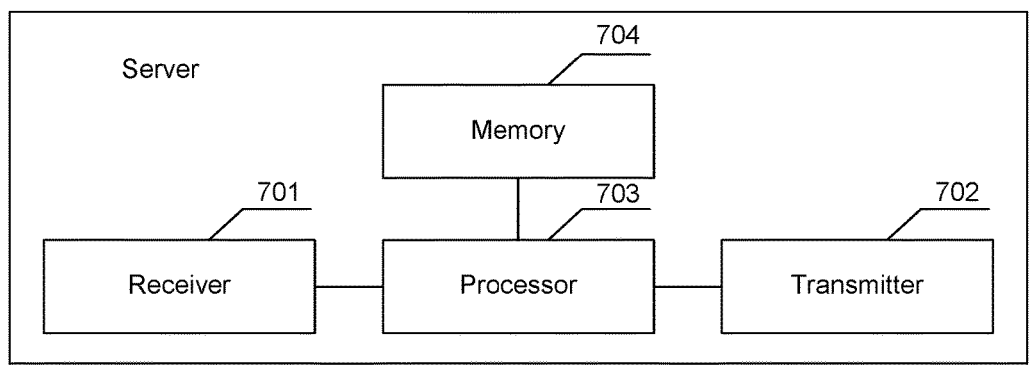
FIG. 7 is a schematic structural diagram of a server according to an embodiment of the present application.

An embodiment of the present application further provides another mobile terminal, which, as shown in FIG. 6, includes: a receiver 601, a transmitter 602, a processor 603, and a memory 604.

The processor 603 is used for instructing the transmitter 602 to send a data request to a server, so as to request the server to return a specified data analysis result; receiving, through the receiver 601, result data and a display template that are sent by the server; and loading the display template, and importing the result data to the display template to display the result data.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

Optionally, the data request is sent by the mobile terminal, and is used for requesting a message of the specified analysis result. A format and sending manner of the message are not limited in the embodiment of the present application. The following provides an optional solution of the sending manner: the processor 603 being used for instructing the transmitter 602 to send a data request to a server includes: after receiving a user instruction and starting a browser, sending the data request to the server by using the browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

Optionally, if the data request is sent by using a browser in the foregoing embodiment, data can be displayed also by using the browser subsequently. This can be combined with functions of the browser, thereby reducing the difficulty in promoting the solution in the embodiment of the present application. Specifically, the processor 603 being used for loading the display template includes: loading the display template by using the browser.

Optionally, the data result is obtained by the side of server through analysis, and in this way, the data analysis result can be obtained on the server in a collective manner, thereby significantly reducing the data processing pressure for devices, such as the mobile terminal, with a low data processing capacity. Types of display templates received by the mobile terminal may not be many, and therefore, the display template can be stored on the side of the mobile terminal, so as to reduce the data traffic of the mobile terminal. It should be noted that, the display template may also be stored on the side of the server and sent by the server to the mobile terminal directly, which does not affect the implementation of the embodiment of the present application. Therefore, this embodiment should not be construed as a limitation to the embodiment of the present application. A specific solution for the mobile terminal to store the display template may be as follows: the processor 603 being used for receiving, through the receiver 601, result data and a display template that are sent by the server includes: receiving, through the receiver 601, result data and a specified display template that are sent by the server; and the processor 603 being used for loading the display template by using the browser includes: loading, by using the browser, a locally stored display template corresponding to the specified display template.

Optionally, there are a lot of types of mobile terminals, and the mobile terminals may have different interfaces; therefore, the side of the server may require interface adaptation, so as to be adapted to requirements of different mobile terminals. This embodiment provides a solution that uses interface adaptation, so as to improve the adaptability of the solution in the embodiment of the present application. Specifically, the processor 603 being used for receiving, through the receiver 601, result data and a display template that are sent by the server includes: receiving, through the receiver 601, result data and a display template that are sent by the server through an interface corresponding to the mobile terminal.

Optionally, the display template is used for importing and displaying data, and according to different functions and different result data, for example, the data volume and data type of the result data, there may be many types of display templates. The embodiment of the present application can be used for displaying chart-type data results, and therefore, specifically:

the display template that the processor 603 receives through the receiver 601 is a chart display template.

A server includes a receiver 701, a transmitter 702, a processor 703, and a memory 704.

The processor 703 is used for receiving, through the receiver 701, a data request sent by a mobile terminal; instructing the transmitter 702 to send result data of a data analysis result specified by the data request, and display template corresponding to the data analysis result to the mobile terminal, so that the mobile terminal loads the display template and imports the data result to the loaded display template.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

The data request is sent by the mobile terminal, and is used for requesting a message of the specified analysis result. A format and sending manner of the message are not limited in the embodiment of the present application. The following provides an optional solution of the sending manner:

Optionally, the foregoing step of receiving a data request sent by a mobile terminal includes: receiving a data request sent by a mobile terminal by using a browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

Figure 8:
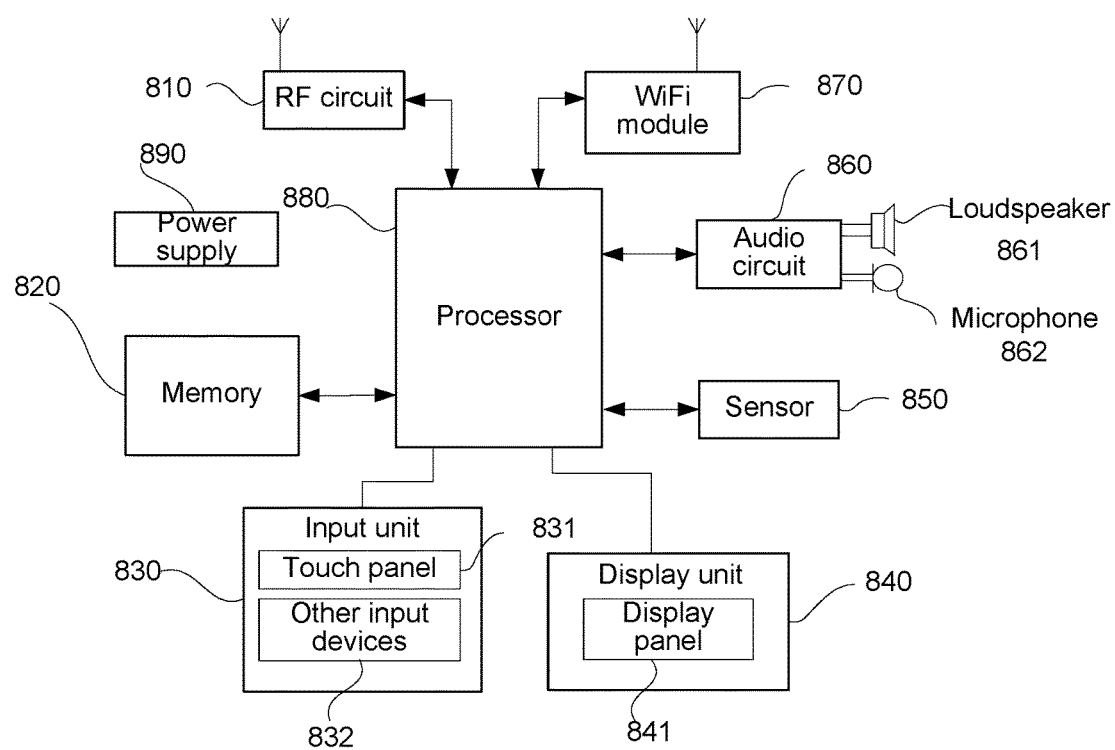
FIG. 8 is a schematic structural diagram of a mobile terminal according to an embodiment of the present application.

An embodiment of the present application further provides another mobile terminal, and as shown in FIG. 8, to facilitate description, only parts related to the embodiment of the present application are shown; for technical details that are not disclosed, please refer to the method embodiment of the present application. The mobile terminal may be any mobile terminal device such as a cell phone, a tablet computer, a Personal Digital Assistant (PDA), a Point of Sales (POS), and a vehicle mounted computer. That the mobile terminal is a cell phone is used as an example:

FIG. 8 is a block diagram of a part of cell phone structure related to a terminal provided in the embodiment of the present application. Referring to FIG. 8, the cell phone includes a radio frequency (RF) circuit 810, a memory 820, an input unit 830, a display unit 840, a sensor 850, an audio circuit 860, a wireless fidelity (WiFi) module 870, a processor 880, a power supply 890, and other components. A person skilled in the art can understand that, the cell phone structure shown in FIG. 8 does not limit the cell phone, and the cell phone may include components more or less than those shown in the figure, or combine some components, or have different component arrangement.

The following specifically describes each component of the cell phone with reference to FIG. 8:

The RF circuit 810 can be used for receiving and sending signals during information sending and receiving or during a call. Particularly, after receiving downlink information of a base station, the RF circuit 810 delivers the downlink information to the processors 880 for processing, and in addition, sends related uplink data to the base station. Usually, the RF circuit includes, but is not limited to, an antenna, at least one amplifier, a transceiver, a coupler, a low noise amplifier (LNA), a duplexer, and so on. In addition, the RF circuit 810 may further communicate with networks and other devices by means of wireless communications. The wireless communications may use any communications standard or protocol, which includes, but is not limited to, Global System of Mobile Communication (GSM), General Packet Radio Service (GPRS), Code Division Multiple Access (CDMA), Wideband Code Division Multiple Access (WCDMA), Long Term Evolution, (LTE), e-mail, and Short Messaging Service (SMS), and so on.

The memory 820 can be used for storing software programs and modules, and the processor 880 performs functional applications and processes data by running the software programs and modules stored in the memory 820. The memory 820 may mainly include a program storage area and a data storage area, where the program storage area may store an operating system, an application program required by at least one function (such as a voice playing function and an image playing function), and so on; and the data storage area may store data created according to use of the cell phone (for example, audio data and a phone book), and so on. In addition, the memory 820 may include a high-speed random access memory, and may also include a non-volatile memory, for example, at least one magnetic disk memory device, a flash memory device, or other volatile solid-state memory devices.

The input unit 830 can be used for receiving input number or character information, and generating key signal input related to user settings and function control. Specifically, the input unit 830 may include a touch panel 831 and another input device 832. The touch panel 831, which is also called a touch screen, can collect a user's touch operation on or near it (for example, an operation performed by a user with a finger, a stylus, or any other suitable object or accessory on the touch panel 831 or near the touch panel 1831), and drive a corresponding connected apparatus according to a preset program. Optionally, the touch panel 831 may include a touch detecting apparatus and a touch controller. The touch detecting apparatus detects a touch direction of the user, and detects a signal produced by the touch operation and sends the signal to the touch controller; the touch controller receives touch information from the touch detecting apparatus, converts the touch information to a touch point coordinate, and sends the touch point coordinate to the processor 880; the touch controller can further receive and execute a command sent by the processor 880. In addition, the touch panel 831 may be implemented as a resistive touch panel, a capacitive touch panel, an infrared touch panel, a surface acoustic wave touch panel, and so on. Apart from the touch panel 831, the input unit 830 may further include another input device 832. Specifically, the other input device 832 may include, but is not limited to, one or more of a physical keyboard, a function key (such as a volume control key and a switch key), a trackball, a mouse, and a joystick.

The display unit 840 can be used for displaying information input by a user or information provided for the user, and various menus of the cell phone. The display unit 840 may include a display panel 841, and optionally, the display panel 841 may be configured in the form of a liquid crystal display (LCD), an organic light-emitting diode (OLED), and so on. Further, the touch panel 831 may cover the display panel 841, and after detecting a touch operation thereon or nearby, the touch panel 831 sends the touch operation to the processor 880 so as to determine a type of the touch event; after that, the processor 880 provides corresponding visual output on the display panel 841 according to the type of the touch event. In FIG. 8, the touch panel 831 and the display panel 841 function as two independent components to implement an input function and an output function, however, in some embodiments, the touch panel 831 and the display panel 841 may be integrated to implement the input and output functions.

The cell phone 800 may further include at least one sensor 850, such as a light sensor, a motion sensor, and other sensors. Specifically, the light sensor may include an ambient light sensor and a proximity sensor, where the ambient light sensor can adjust the brightness of the display panel 841 according to the brightness of ambient light rays, and the proximity sensor can turn off the display panel 841 and/or backlight when the cell phone moves to the ear. As a type of motion sensors, a gravity acceleration sensor can detect the magnitude of acceleration in each direction (generally, there are three axes), and in a static state, the gravity acceleration sensor can detect the magnitude and direction of gravity, and can be used for recognizing a cell phone attitude application (for example, switching between a landscape mode and a portrait mode, related games, and magnetometer attitude calibration), functions related to vibration recognition (such as pedometer and tapping), and so on; other sensors such as a gyroscope, a barometer, a hygrometer, a thermometer, and an infrared sensor that may be further configured on the cell phone are not described in detail herein.

The audio circuit 860, a loudspeaker 861, and a microphone 862 can provide an audio interface between the user and the cell phone. The audio circuit 860 can convert received audio data to an electric signal and transmit the electric signal to the loudspeaker 861; the loudspeaker 861 converts the electric signal to a voice signal and outputs the voice signal. In another aspect, the microphone 862 converts a collected voice signal to an electric signal; the audio circuit 860 receives the electric signal, converts the electric signal to audio data, and then outputs the audio data to the processor 880 for processing; and the processed audio data is sent to, for example, another cell phone through the RF circuit 810; alternatively, the audio data is output to the memory 820 so as to be further processed.

WiFi belongs to short-distance wireless transmission technologies, and by means of the WiFi module 870, the mobile terminal can help a user send and receive e-mails, browse web pages, access streaming media, and so on; the WiFi module 870 provides wireless broadband Internet access for the user. Although the WiFi module 870 is shown in FIG. 8, it should be noted that the WiFi module 870 is not a necessary component of the cell phone 800, and absolutely, it can be omitted as required so long as the essence of the present application is not changed.

The processor 880 is a control center of the cell phone; the processor 880 connects components of the whole cell phone by using various interfaces and circuits, and performs various functions of the cell phone and processes data by running or executing software programs and/or modules stored in the memory 820 and calling data stored in the memory 820, thereby performing overall monitoring on the cell phone. Optionally, the processor 880 may include one or more processing units. Optimally, the processor 880 may integrate an application processor and a modem processor. The application processor mainly processes the operating system, user interface, application programs, and so on, and the modem processor mainly processes wireless communications. It can be understood that the modem processor may not be integrated in the processor 880.

The cell phone 800 further includes the power supply 890 (such as a battery) for supplying power to each component. Optimally, the power supply may be logically connected to the processor 880 through a power management system, so that functions such as charging, discharging, power consumption management are managed by using the power management system.

The cell phone 800 may further include a camera, a Bluetooth module, and so on, though these components are not shown, and detailed description is omitted herein.

In the embodiment of the present application, the processor included in the terminal further has the following functions:

The processor 880 is used for instructing sending a data request to a server, so as to request the server to return a specified data analysis result; receiving result data and a display template that are sent by the server; and loading the display template, and importing the result data to the display template to display the result data.

In the foregoing embodiment, the mobile terminal sends a data request to the server, the server returns corresponding result data and a corresponding display template, and the mobile terminal loads the display template and imports the result data to the display template, thereby displaying the result data. Neither the result data nor the display template needs to be sent in a picture mode, and therefore no screenshot needs to be taken. The mobile terminal displays the result data in time and data content is editable.

Optionally, the data request is sent by the mobile terminal, and is used for requesting a message of the specified analysis result. A format and sending manner of the message are not limited in the embodiment of the present application. The following provides an optional solution of the sending manner: the processor 880 being used for instructing sending a data request to a server includes: after receiving a user instruction and starting a browser, sending a data request to a server by using the browser.

On the side of the mobile terminal, it is convenient to send the data request by using a browser. In addition, the browser further has a function of displaying data and a function of loading a display template, and therefore can function to display the result data subsequently. Therefore, this manner can be used as a preferable implementation solution.

Optionally, if the data request is sent by using a browser in the foregoing embodiment, data can be displayed also by using the browser subsequently. This can be combined with functions of the browser, thereby reducing the difficulty in promoting the solution in the embodiment of the present application. Specifically, the processor 880 being used for loading the display template includes: loading the display template by using the browser.

Optionally, the data result is obtained by the side of server through analysis, and in this way, the data analysis result can be obtained on the server in a collective manner, thereby significantly reducing the data processing pressure for devices, such as the mobile terminal, with a low data processing capacity. Types of display templates received by the mobile terminal may not many, and therefore, the display template can be stored on the side of the mobile terminal, so as to reduce the data traffic of the mobile terminal. It should be noted that, the display template may also be stored on the side of the server and sent by the server to the mobile terminal directly, which does not affect the implementation of the embodiment of the present application. Therefore, this embodiment should not be construed as a limitation to the embodiment of the present application. A specific solution for the mobile terminal to store the display template may be as follows: the processor 880 being used for receiving result data and a display template that are sent by the server includes: receiving result data and a specified display template that are sent by the server; and the processor 880 being used for loading the display template by using the browser includes: loading, by using the browser, a locally stored display template corresponding to the specified display template.

Optionally, there are a lot of types of mobile terminals, and the mobile terminals may have different interfaces; therefore, the side of the server may require interface adaptation, so as to be adapted to requirements of different mobile terminals. This embodiment provides a solution that uses interface adaptation, so as to improve the adaptability of the solution in the embodiment of the present application. Specifically, the processor 880 being used for receiving result data and a display template that are sent by the server includes: receiving result data and a display template that are sent by the server through an interface corresponding to the mobile terminal.

Optionally, the display template is used for importing and displaying data, and according to different functions and different result data, for example, the data volume and data type of the result data, there may be many types of display templates. The embodiment of the present application can be used for displaying chart-type data results, and therefore, specifically:

the display template received by the processor 880 is a chart display template.

Figure 9:
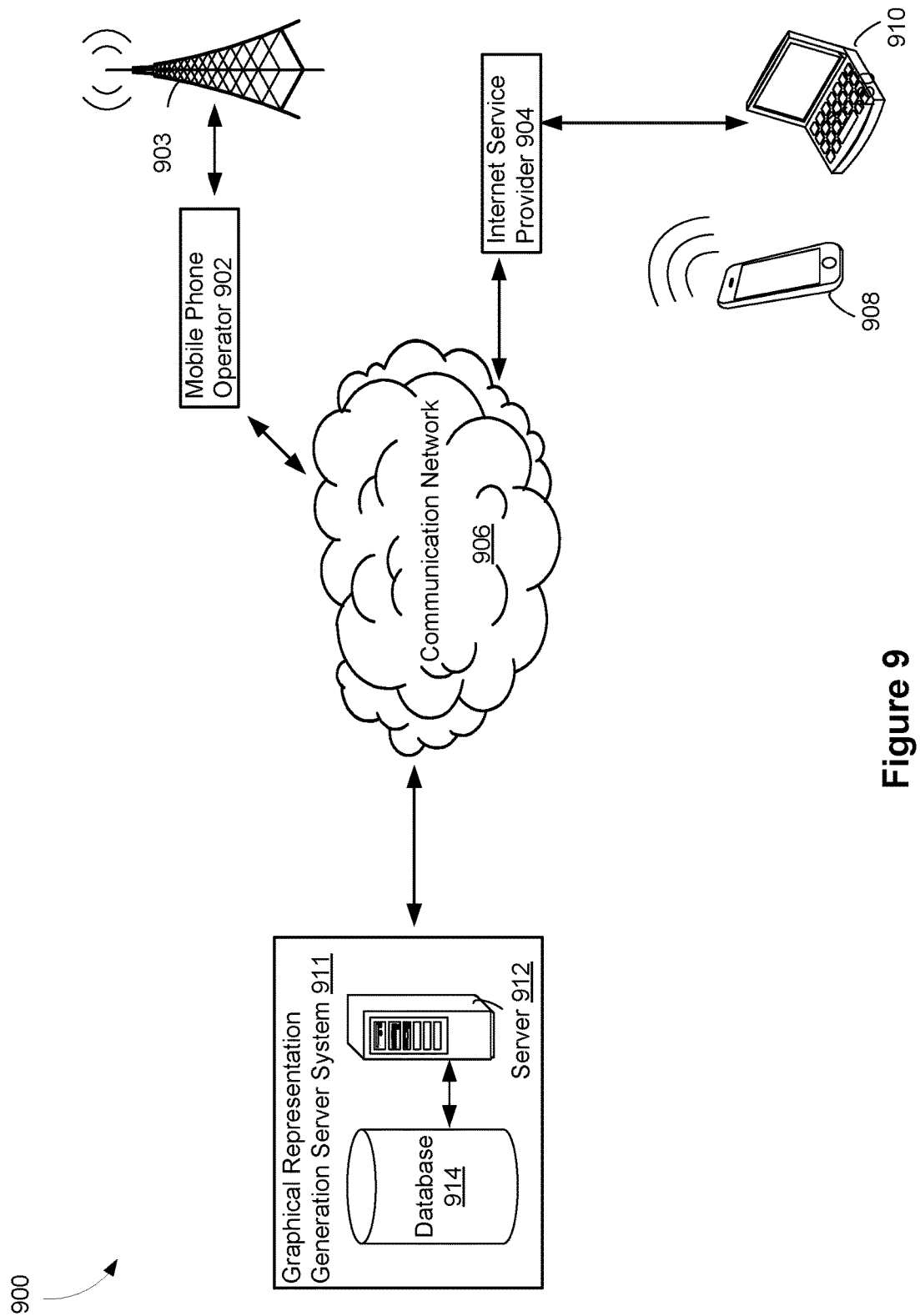
FIG. 9 is a diagram of a client-server environment for displaying a data analysis result, in accordance with some implementations of the present application.

FIG. 9 is a diagram of a client-server environment 900 for displaying a data analysis result, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein. To that end, the client-server environment 900 includes one or more mobile phone operators 902, one or more internet service providers 904, and a communications network 906.

The mobile phone operator 902 (e.g., wireless carrier), and the Internet service provider 904 are capable of being connected to the communication network 906 in order to exchange information with one another and/or other devices and systems. Additionally, the mobile phone operator 902 and the Internet service provider 904 are operable to connect client devices to the communication network 906 as well. For example, a smart phone 908 is operable with the network of the mobile phone operator 902, which includes for example, a base station 903. Similarly, for example, a laptop computer 910 (or tablet, desktop, smart television, workstation or the like) is connectable to the network provided by an Internet service provider 904, which is ultimately connectable to the communication network 906.

The communication network 906 may be any combination of wired and wireless local area network (LAN) and/or wide area network (WAN), such as an intranet, an extranet, including a portion of the Internet. It is sufficient that the communication network 906 provides communication capability between client devices (e.g., smart phones 908 and personal computers 910) and servers. In some implementations, the communication network 906 uses the HyperText Transport Protocol (HTTP) to transport information using the Transmission Control Protocol/Internet Protocol (TCP/IP). HTTP permits a client device to access various resources available via the communication network 906. However, the various implementations described herein are not limited to the use of any particular protocol.

In some implementations, the client-server environment 900 further includes a graphical representation generation server system 911. Within the graphical representation generation server system 911, there is a server computer 912 (e.g., a network server such as a web server) for receiving and processing data received from the client device 908/910 (e.g., raw data to convert into a graphical representation). In some implementations, the graphical representation generation server system 911 stores (e.g., in a database 914) and maintains template information for generating various graphical representations of data and in some embodiments, the graphical representation generation server system 911 stores (e.g., in a database 914) and maintains previously generated graphical representations sent to one or more client devices 908/910.

Those skilled in the art will appreciate from the present disclosure that any number of such devices and/or systems may be provided in a client-server environment, and particular devices may be altogether absent. In other words, the client-server environment 900 is merely an example provided to discuss more pertinent features of the present disclosure. Additional server systems, such as domain name servers and client distribution networks may be present in the client-server environment 900, but have been omitted for ease of explanation.

Figure 10:
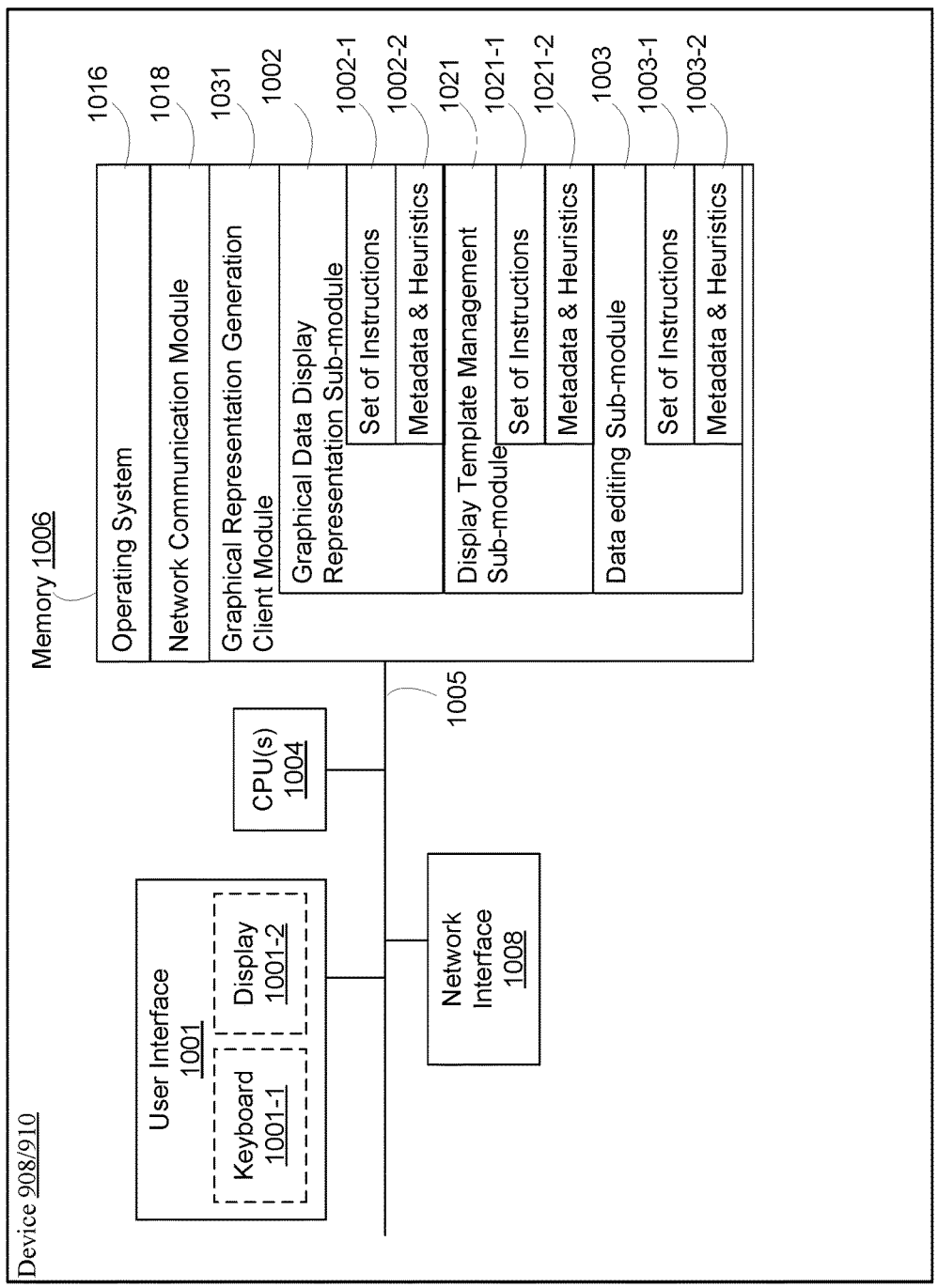
FIG. 10 is a diagram of an example implementation of the device for displaying a data analysis result, in accordance with some implementations of the present application.

FIG. 10 is a diagram of an example implementation of the device 908/910 for displaying a data analysis result, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein.

Device 908/910 includes one or more processing units (CPU's) 1004, one or more network or other communications interfaces 1008, a user interface 1001 (optionally comprising elements such as a keyboard 1001-1 or display 1001-2), memory 1006, and one or more communication buses 1005 for interconnecting these and various other components. The communication buses 1005 may include circuitry (sometimes called a chipset) that interconnects and controls communications between system components. Memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1006 may optionally include one or more storage devices remotely located from the CPU(s) 1004. Memory 1006, including the non-volatile and volatile memory device(s) within memory 1006, comprises a non-transitory computer readable storage medium.

In some implementations, memory 1006 or the non-transitory computer readable storage medium of memory 1006 stores the following programs, modules and data structures, or a subset thereof including an operating system 1016, a network communication module 1018, and a graphical representation generation client module 1031.

The operating system 1016 includes procedures for handling various basic system services and for performing hardware dependent tasks.

The network communication module 1018 facilitates communication with other devices via the one or more communication network interfaces 1008 (wired or wireless) and one or more communication networks, such as the internet, other wide area networks, local area networks, metropolitan area networks, and so on.

In some implementations, the graphical representation generation client module 1031 includes a graphical data display representation sub-module 1002 for interpreting received information from a server and optionally one or more stored graphical display templates to enable display of an editable graphical representation of raw data sent to the server. To this end, the graphical data display representation sub-module 1002 includes a set of instructions 1002-1 and, optionally, metadata 1002-2. In some implementations, the graphical representation generation client module 1031 includes a display template management sub-module 1021 having a set of instructions 1021-1 (e.g., for optionally storing in memory one or more graphical display templates corresponding to one or more graphical representations of data) and, optionally, metadata 1021-2, as well as a data editing sub-module 1003 having a set of instructions 1003-1 (e.g., for enabling editing of raw data sent to the server as well as editing of one or more editable graphical display representations of the raw data) and optionally metadata 1003-2.

Figure 11:
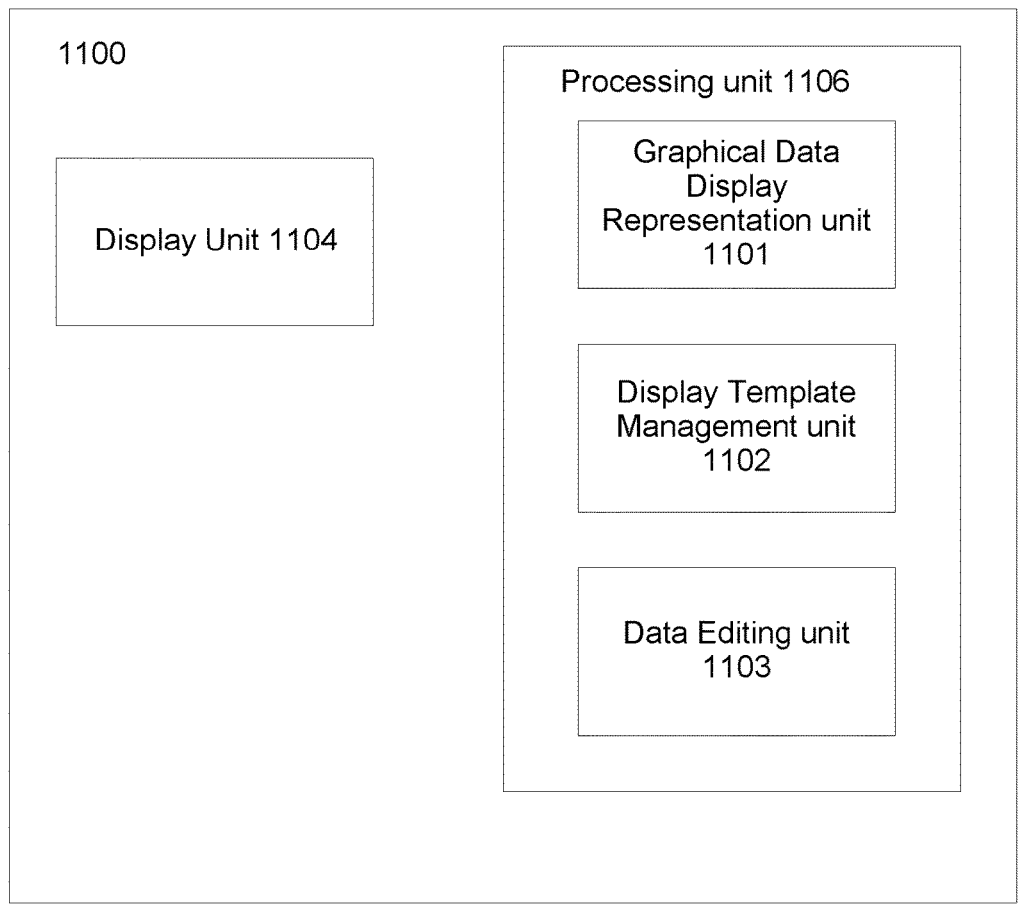
FIG. 11 is a structural diagram of a realization apparatus for displaying a data analysis result in accordance with some implementations of the present application.

FIG. 11 is a structural diagram of realization device 1100 of displaying a data analysis result based on the embodiment of the present application.

As is shown in FIG. 11, this device includes: a display unit 1104, and a processing unit 1106 comprising a graphical data display representation unit 1101, display template management unit 1102, and data editing unit 1103, among which:

Graphical data display representation unit 1101: configured to interpret received information from a server and optionally one or more stored graphical display templates to enable display of an editable graphical representation of raw data sent to the server;

Display template management unit 1102: configured to temporarily or permanently store in memory one or more graphical display templates corresponding to one or more graphical representations of data, and optionally update, delete or modify the one or more templates;

Data editing unit 1103: configured to enable editing of raw data sent to the server as well as editing of one or more editable graphical display representations of the raw data.

Display unit 1104 is configured to display a data analysis result in accordance with various embodiments described herein.

It is acceptable to integrate the device shown in FIG. 11 into hardware entities of a variety of networks. For example, the realization device for the generation of a protective user interface is allowed to be integrated into: devices including feature phone, smart phone, palmtop, personal computer (PC), tablet computer or personal digital assistant (PDA), etc.

The mentioned mobile terminal can be smart phone, tablet computer and so on, and the mentioned application program can be built-in browser of mobile terminal, game, micro blog, WeChat, Baidu space, QQ space, etc.

Figure 12A:
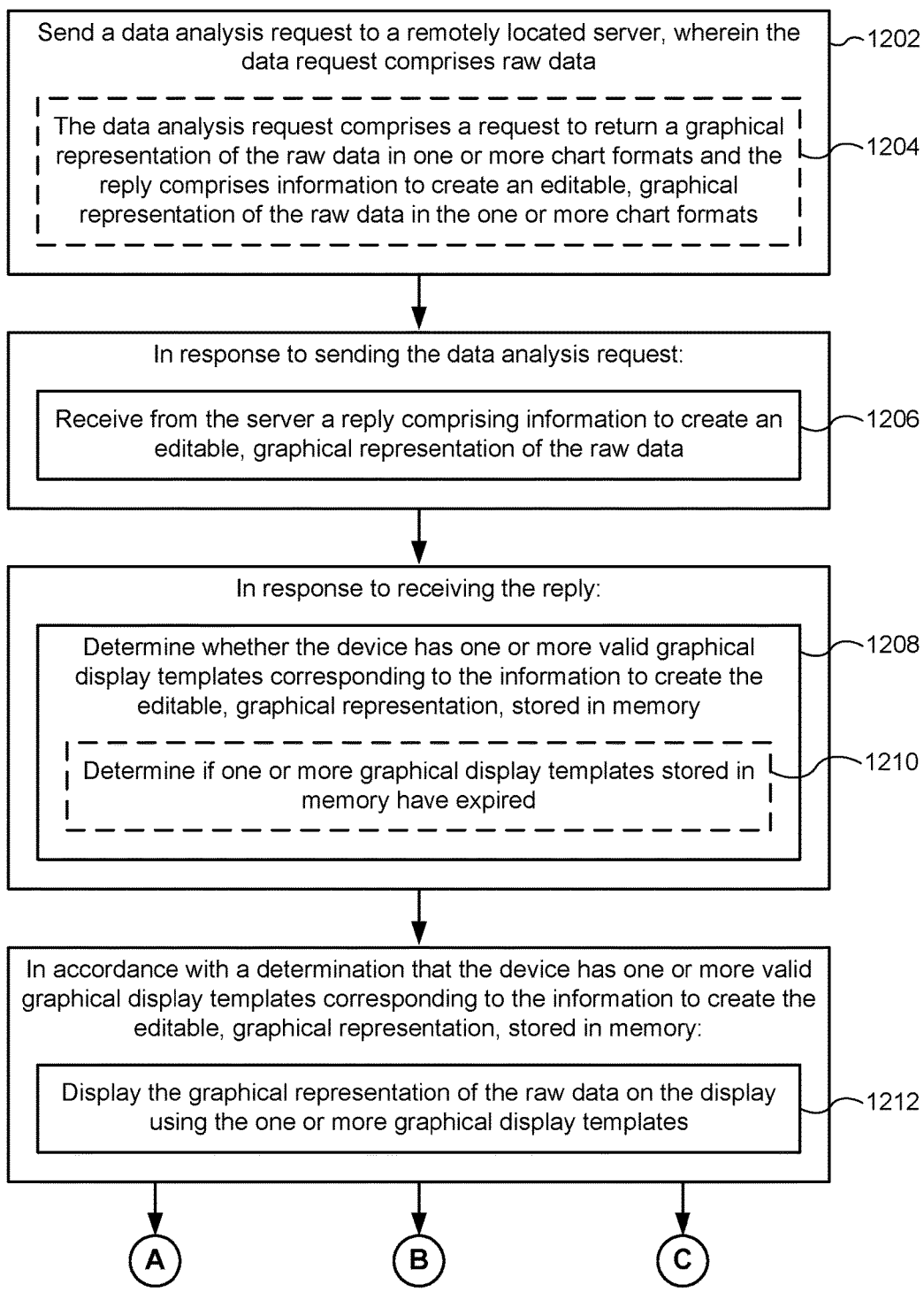
FIGS. 12A-12C are a flow chart of a method of displaying a data analysis result in accordance with some implementations of the present application.
Figure 12B:
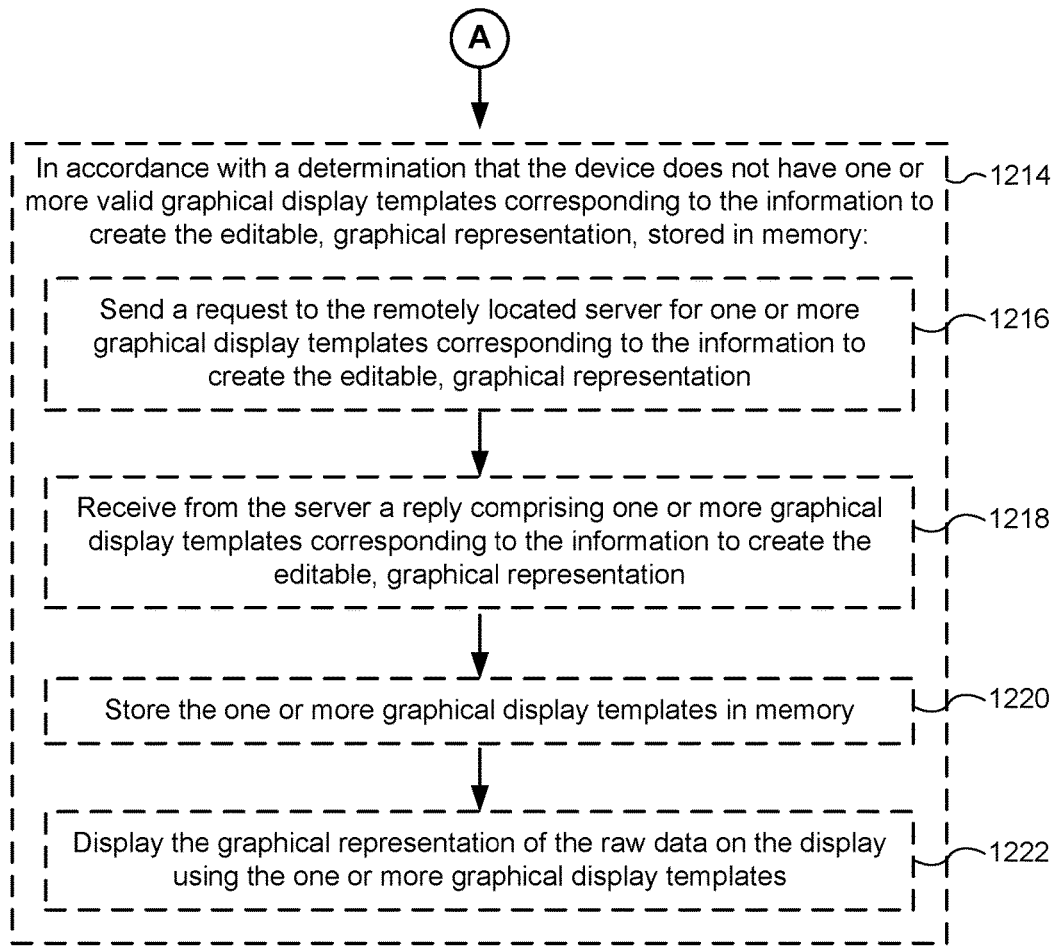
Figure 12C:
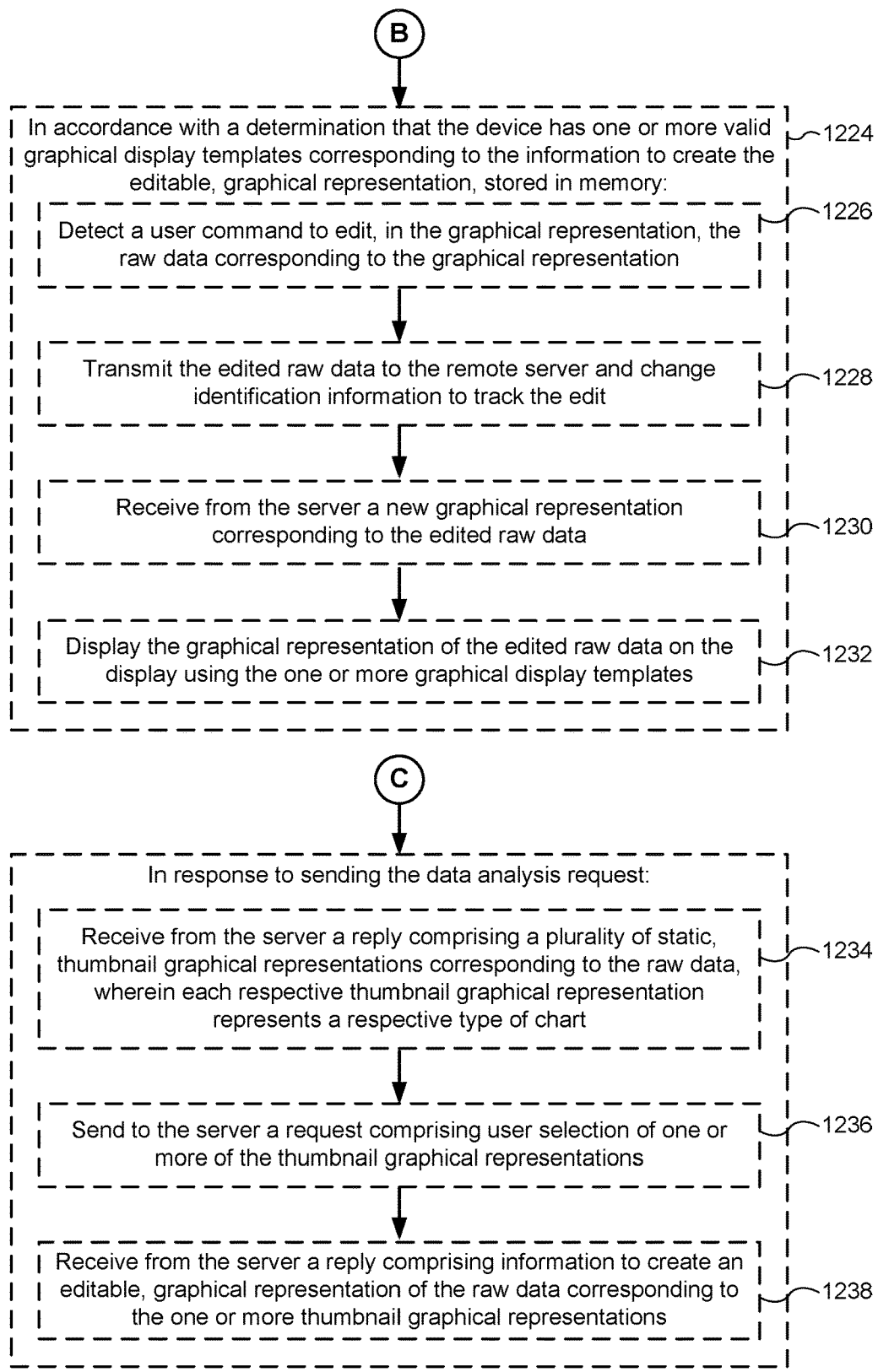

FIGS. 12A-12C are a flow chart of a method 1200 of displaying a data analysis result in accordance with some implementations of the present application. At a portable electronic device having one or more processors and memory for storing programs to be executed by the one or more processors, the method 1200 comprises sending (1202) a data analysis request to a remotely located server, wherein the data request comprises raw data. In some embodiments, the data analysis request comprises (1204) a request to return a graphical representation of the raw data in one or more chart formats and the reply comprises information to create an editable, graphical representation of the raw data in the one or more chart formats.

The method further includes, in response to sending the data analysis request, receiving (1206) from the server a reply comprising information to create an editable, graphical representation of the raw data. The method further includes, in response to receiving the reply, determining (1208) whether the device has one or more valid graphical display templates corresponding to the information to create the editable, graphical representation, stored in memory. In some embodiments, this includes determining (1210) if one or more graphical display templates stored in memory have expired.

The method further includes, in accordance with a determination that the device has one or more valid graphical display templates corresponding to the information to create the editable, graphical representation, stored in memory, displaying (1212) the graphical representation of the raw data on the display using the one or more graphical display templates.

In some embodiments, the method further includes, in accordance with a determination (1214) that the device does not have one or more valid graphical display templates corresponding to the information to create the editable, graphical representation, stored in memory, sending (1216) a request to the remotely located server for one or more graphical display templates corresponding to the information to create the editable, graphical representation, receiving (1218) from the server a reply comprising one or more graphical display templates corresponding to the information to create the editable, graphical representation, storing (1220) the one or more graphical display templates in memory, and displaying (1222) the graphical representation of the raw data on the display using the one or more graphical display templates.

In some embodiments, the method further includes, in accordance with a determination (1224) that the device has one or more valid graphical display templates corresponding to the information to create the editable, graphical representation, stored in memory, detecting (1226) a user command to edit, in the graphical representation, the raw data corresponding to the graphical representation, transmitting (1228) the edited raw data to the remote server and change identification information to track the edit, receiving (1230) from the server a new graphical representation corresponding to the edited raw data, and displaying (1232) the graphical representation of the edited raw data on the display using the one or more graphical display templates.

In some embodiments, the method further includes, in response to sending the data analysis request, receiving (1234) from the server a reply comprising a plurality of static, thumbnail graphical representations corresponding to the raw data, wherein each respective thumbnail graphical representation represents a respective type of chart, sending (1236) to the server a request comprising user selection of one or more of the thumbnail graphical representations, and receiving (1238) from the server a reply comprising information to create an editable, graphical representation of the raw data corresponding to the one or more thumbnail graphical representations.

Figure 13:
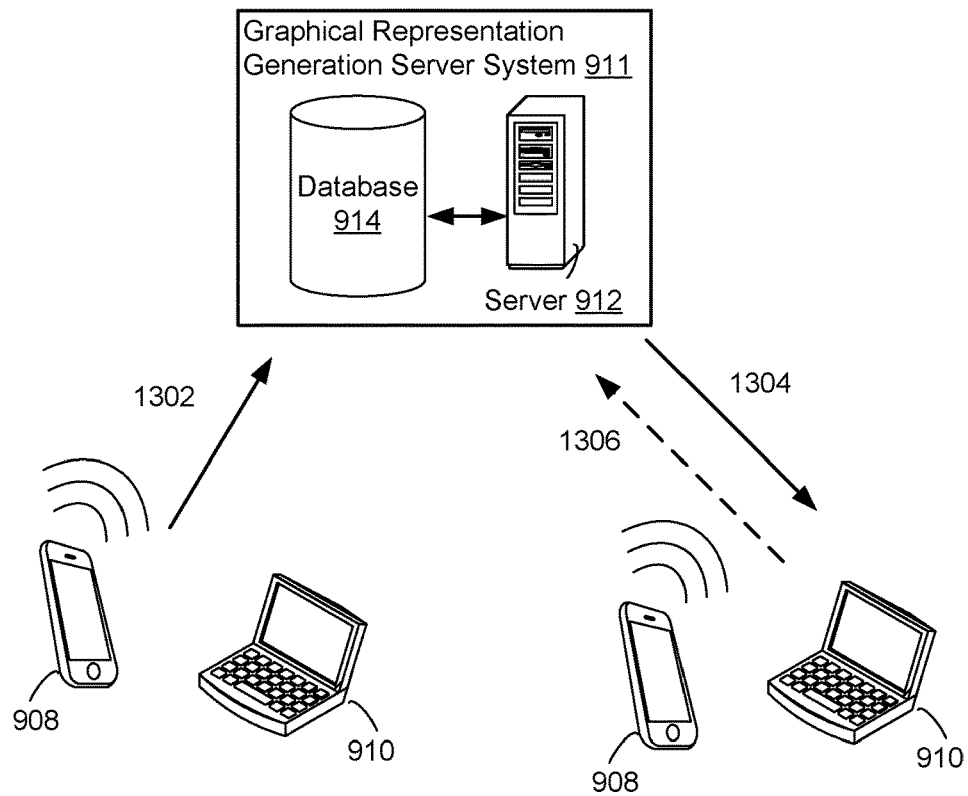
FIG. 13 illustrates an exemplary embodiment of a system of generating a graphical representation of data.
Figure 13:
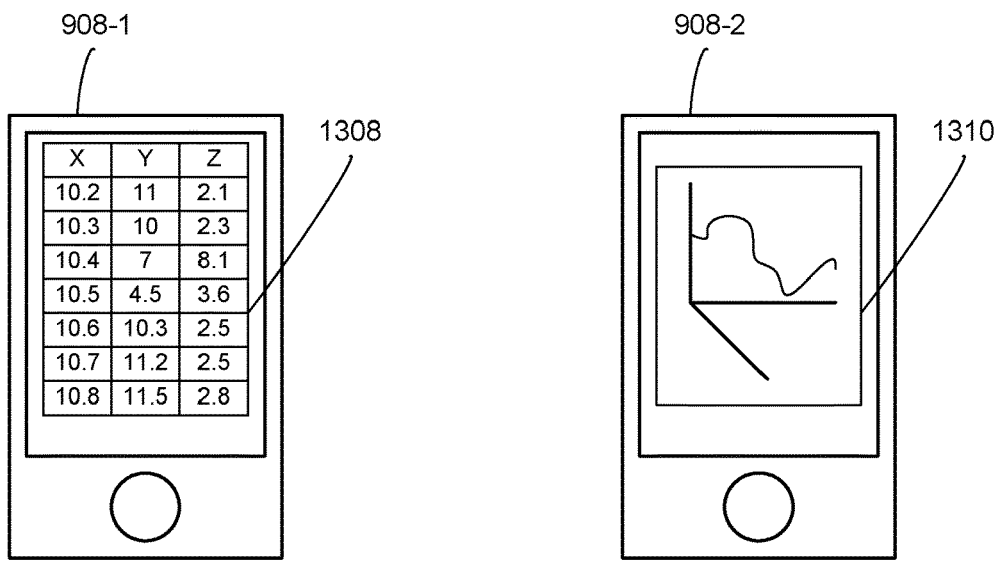

FIG. 13 illustrates an exemplary embodiment of a system 1300 of generating a graphical representation of data. In this example, the graphical representation generation server system 911 receives a data analysis request 1302 comprising raw data for analysis and conversion into a graphical representation of the raw data. In response to sending the data analysis request, the portable electronic device 908/910 receives from the server system 911, a reply 1304 comprising information to create an editable, graphical representation of the raw data. In some embodiments, the portable electronic device 908/910 sends another data analysis request 1306, for example, after editing a prior editable graphical representation of data, or to request a different type of graphical representation (e.g., a pie chart or line graph etc.). In some embodiments, an intermediate reply is received at the portable electronic device 908/910 from server system 911, before receiving the desired one or more graphical representations of the raw data. For example, in some embodiments, the intermediate reply comprises thumbnail images of various graphical representations of the raw data, allowing the user to select one or more to receive as fully editable graphical representations of the raw data. In some embodiments, the server system 911 determines the best (e.g., most appropriate, most informative) type of graphical representation corresponding to the received raw data from portable electronic device 908/910. In some embodiments, the portable electronic device 908/910 determines the best type of graphical representation to convey the raw data and sends that determination in the data analysis request 1302.

An exemplary representation of raw data 1308 is shown in a user interface on portable electronic device 908-1 before sending the raw data in data analysis request 1302 to the server system 911. An exemplary representation of a graphical representation 1310 is shown in a user interface on portable electronic device 908-2.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of displaying a data analysis result on a portable electronic device comprising:
    at the portable electronic device having one or more processors, a display and memory for storing programs to be executed by the one or more processors:
    sending a data analysis request to a remotely located server, including sending by the portable electronic device raw data to the remotely located server;
    in response to sending the data analysis request including sending the raw data to the remotely located server, receiving from the remotely located server a first reply including a plurality of static graphical representations of the raw data, wherein the plurality of static graphical representations of the raw data correspond to results of analysis of the raw data performed at the remotely located server, including a first static image corresponding to a first analysis result of the raw data and a second static image corresponding to a second analysis result of the raw data that is visually different from the first static image;
    concurrently displaying the plurality of static graphical representations of the raw data including the first static image and the second static image on the display and detecting a user selection of one of the plurality of static graphical representations of the raw data;
    sending a user selection of the first static image of the plurality of static graphical representations of the raw data;
    in response to sending the user selection of the first static image of the plurality of static graphical representations of the raw data, receiving a second reply from the remotely located server, including receiving information configurable to create one or more editable graphical representations of the raw data in accordance with one or more predefined graphical display templates corresponding to the user-selected first static image of the plurality of static graphical representations of the raw data; and
    replacing the concurrent display of the plurality of static graphical representations of the raw data with a new display of an editable graphical representation of the raw data according to the first static image.

2. The method of claim 1, further including:
    in response to receiving the second reply from the remotely located server:
        determining whether the portable electronic device has one or more valid graphical display templates corresponding to the information configurable to create the one or more editable graphical representations of the raw data, stored locally at the portable electronic device; and
        in accordance with a determination that the portable electronic device has one or more valid graphical display templates corresponding to the information configurable to create the editable graphical representations of the raw data, stored locally at the portable electronic device, displaying the editable graphical representations of the raw data on the display using the one or more graphical display templates.

3. The method of claim 2, further comprising:
    in accordance with a determination that the portable electronic device does not have one or more valid graphical display templates corresponding to the information configurable to create the editable graphical representations, stored locally at the portable electronic device, sending a request to the remotely located server for the one or more graphical display templates corresponding to the information configurable to create the editable graphical representations.

4. The method of claim 2, wherein determining whether the device has one or more valid graphical display templates corresponding to the information configurable to create the editable graphical representations, stored locally at the portable electronic device, comprises determining if one or more graphical display templates stored in memory have expired.

5. The method of claim 2, further comprising:
    in accordance with a determination that the device has one or more valid graphical display templates corresponding to the information configurable to create the editable graphical representations, stored locally at the portable electronic device:
        detecting a user command to edit, in at least one of the editable graphical representations, the raw data corresponding to the first static image;
        transmitting the edited raw data to the remotely located server;
        receiving from the server a new graphical representation corresponding to the edited raw data; and
        displaying the graphical representation of the edited raw data on the display using the one or more graphical display templates.

6. The method of claim 1, wherein the plurality of static graphical representations of the raw data includes a plurality of static, thumbnail images corresponding to the raw data, the plurality of static, thumbnail images including the first and second static images, wherein each respective thumbnail image represents a respective type of chart.

7. The method of claim 6, wherein the server has selected respective types of charts for graphically representing the raw data in accordance with one or more characteristics of the raw data.

8. A portable electronic device, comprising:
a display;
one or more processors;
memory; and
one or more programs, wherein the one or more programs are stored in the memory and configured to be executed by the one or more processors, the one or more programs including instructions for:
sending a data analysis request to a remotely located server, including sending by the portable electronic device raw data to the remotely located server;
in response to sending the data analysis request including sending the raw data to the remotely located server, receiving from the remotely located server a first reply including a plurality of static graphical representations of the raw data, wherein the plurality of static graphical representations of the raw data correspond to results of analysis of the raw data performed at the remotely located server, and including a first static image corresponding to a first analysis result of the raw data and a second static image corresponding to a second analysis result of the raw data that is visually different from the first static image;
sending a user selection of the first static image of the plurality of static graphical representations of the raw data;
in response to sending the user selection of the first static image of the plurality of static graphical representations of the raw data, receiving a second reply from the remotely located server, including receiving information configurable to create one or more editable graphical representations of the raw data in accordance with one or more predefined graphical display templates corresponding to the user-selected first static image of the plurality of static graphical representations of the raw data; and
replacing the concurrent display of the plurality of static graphical representations of the raw data with a new display of an editable graphical representation of the raw data according to the first static image.

9. The portable electronic device of claim 8, wherein the programs further include instructions for:
in response to receiving the second reply from the remotely located server:
determining whether the portable electronic device has one or more valid graphical display templates corresponding to the information configurable to create the one or more editable graphical representations of the raw data, stored locally at the portable electronic device; and
in accordance with a determination that the portable electronic device has one or more valid graphical display templates corresponding to the information configurable to create the editable graphical representations of the raw data, stored locally at the portable electronic device, displaying the editable graphical representations of the raw data on the display using the one or more graphical display templates.

10. The portable electronic device of claim 9, wherein the programs further include instructions for:

in accordance with a determination that the portable electronic device does not have one or more valid graphical display templates corresponding to the information configurable to create the editable graphical representations, stored locally at the portable electronic device, sending a request to the remotely located server for the one or more graphical display templates corresponding to the information configurable to create the editable graphical representations.

11. The portable electronic device of claim 10, wherein determining whether the device has one or more valid graphical display templates corresponding to the information configurable to create the editable graphical representations, stored locally at the portable electronic device, comprises determining if one or more graphical display templates stored in memory have expired.

12. The portable electronic device of claim 10, wherein the programs further include instructions for:
in accordance with a determination that the device has one or more valid graphical display templates corresponding to the information configurable to create the editable graphical representations, stored locally at the portable electronic device:
detecting a user command to edit, in at least one of the editable graphical representations, the raw data corresponding to the first static image;
transmitting the edited raw data to the remotely located server;
receiving from the server a new graphical representation corresponding to the edited raw data; and
displaying the graphical representation of the edited raw data on the display using the one or more graphical display templates.

13. The portable electronic device of claim 8, wherein the plurality of static graphical representations of the raw data includes a plurality of static, thumbnail images corresponding to the raw data, the plurality of static, thumbnail images including the first and second static images, wherein each respective thumbnail image represents a respective type of chart.

14. The portable electronic device of claim 13, wherein the server has selected respective types of charts for graphically representing the raw data in accordance with one or more characteristics of the raw data.

15. A non-transitory computer readable storage medium storing one or more programs, the one or more programs comprising instructions, which when executed by an electronic device with a display and a camera, cause the electronic device to perform operations comprising:
sending a data analysis request to a remotely located server, including sending by the portable electronic device raw data to the remotely located server;
in response to sending the data analysis request including sending the raw data to the remotely located server, receiving from the remotely located server a first reply including a plurality of static graphical representations of the raw data, wherein the plurality of static graphical representations of the raw data correspond to results of analysis of the raw data performed at the remotely located server, and including a first static image corresponding to a first analysis result of the raw data and a second static image corresponding to a second analysis result of the raw data that is visually different from the first static image;
sending a user selection of the first static image of the plurality of static graphical representations of the raw data;

in response to sending the user selection of the first static image of the plurality of static graphical representations of the raw data, receiving a second reply from the remotely located server, including receiving information configurable to create one or more editable graphical representations of the raw data in accordance with one or more predefined graphical display templates corresponding to the user-selected first static image of the plurality of static graphical representations of the raw data; and replacing the concurrent display of the plurality of static graphical representations of the raw data with a new display of an editable graphical representation of the raw data according to the first static image.

16. The computer-readable storage medium of claim 15, wherein the operations further include:

in response to receiving the second reply from the remotely located server:
determining whether the portable electronic device has one or more valid graphical display templates corresponding to the information configurable to create the one or more editable graphical representations of the raw data, stored locally at the portable electronic device; and
in accordance with a determination that the portable electronic device has one or more valid graphical display templates corresponding to the information configurable to create the editable graphical representations of the raw data, stored locally at the portable electronic device, displaying the editable graphical representations of the raw data on the display using the one or more graphical display templates.

17. The computer-readable storage medium of claim 16, wherein the operations further include:

in accordance with a determination that the portable electronic device does not have one or more valid graphical display templates corresponding to the information configurable to create the editable graphical representations, stored locally at the portable electronic device, sending a request to the remotely located server for the one or more graphical display templates corresponding to the information configurable to create the editable graphical representations.

18. The computer-readable storage medium of claim 17, wherein determining whether the device has one or more valid graphical display templates corresponding to the information configurable to create the editable graphical representations, stored locally at the portable electronic device, comprises determining if one or more graphical display templates stored in memory have expired.

19. The computer-readable storage medium of claim 17, wherein the programs further include instructions for:

in accordance with a determination that the device has one or more valid graphical display templates corresponding to the information configurable to create the editable graphical representations, stored locally at the portable electronic device:
detecting a user command to edit, in at least one of the editable graphical representations, the raw data corresponding to the first static image;
transmitting the edited raw data to the remotely located server;
receiving from the server a new graphical representation corresponding to the edited raw data; and
displaying the graphical representation of the edited raw data on the display using the one or more graphical display templates.

20. The computer-readable storage medium of claim 15, wherein the plurality of static graphical representations of the raw data includes a plurality of static, thumbnail images corresponding to the raw data, the plurality of static, thumbnail images including the first and second static images, wherein each respective thumbnail image represents a respective type of chart.

* * * * *